May 8, 1928.

R. L. HANAU

DENTAL ARTICULATOR

Filed Feb. 3, 1923     2 Sheets-Sheet 1

Rudolph L. Hanau, INVENTOR.

BY

ATTORNEY.

May 8, 1928.
R. L. HANAU
DENTAL ARTICULATOR
Filed Feb. 3, 1923
1,668,845
2 Sheets-Sheet 2
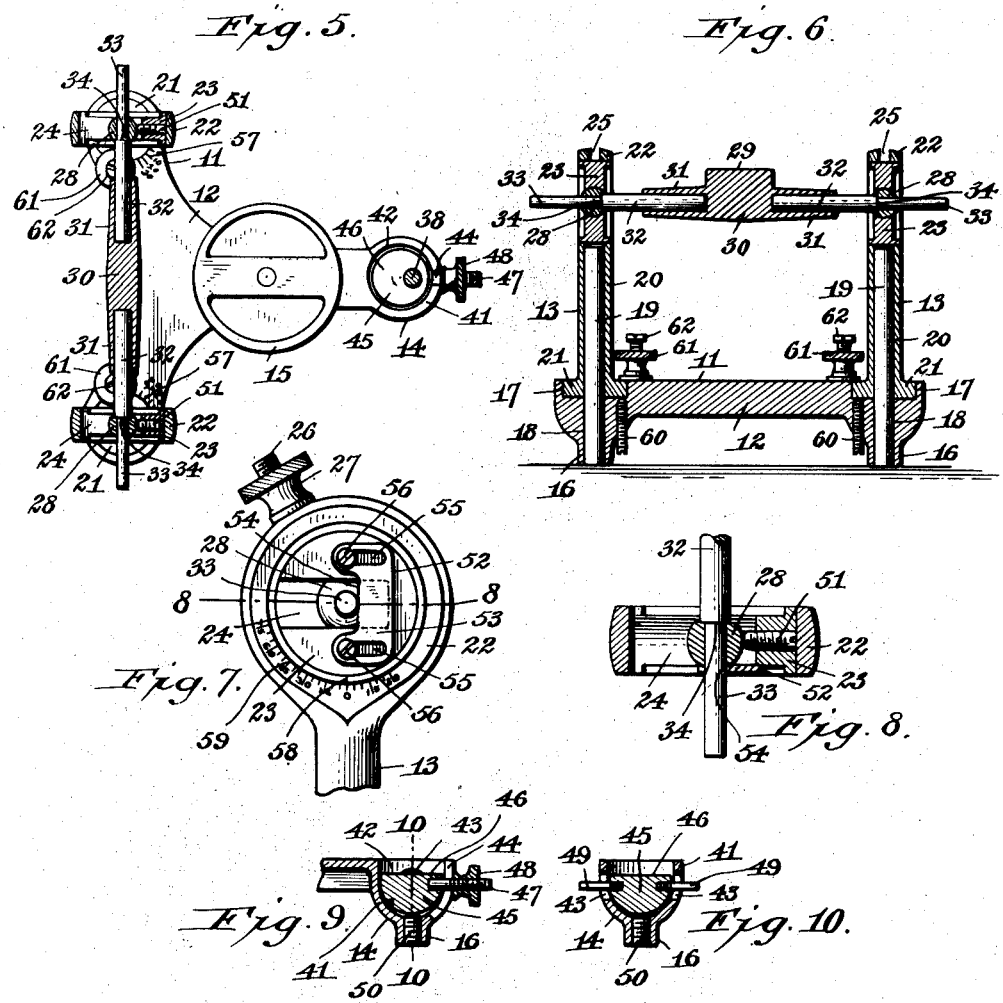
Rudolph L. Hanau, INVENTOR.
BY Emil Neubach
ATTORNEY.

Patented May 8, 1928.

1,668,845

UNITED STATES PATENT OFFICE.

RUDOLPH L. HANAU, OF BUFFALO, NEW YORK, ASSIGNOR TO JACOB L. STERN, OF BUFFALO, NEW YORK.

DENTAL ARTICULATOR.

Application filed February 3, 1923. Serial No. 616,841.

My invention relates to dental articulators, the purpose of which, as will be clear to those skilled in the art, is to support for manipulation thereof, artificial teeth or dentures on plates or bases in the same or equivalent relation to each other that they occupy when placed in the mouth of a patient.

The primary object of my invention is to provide a simple device of this kind by means of which the results or the movements of the human mandible are reproduced by equivalent movements; and in this respect I wish to state that by the term "equivalent" I mean that my device is able to reproduce an equivalent result, and not necessarily reproductions of the movements of the human mandible or movements exactly like those of the human mandible, as ordinarily understood.

Another object of my invention is to provide such a device with a number of relatively movable parts capable of being adjusted so as to conform to the measurements and conditions found in the patient for whom artificial teeth are to be provided, and whereby the teeth will be positioned to conform to the anatomical measurements taken from the patient; for example, with casts taken off the patient or with temporary plates made of the casts; also wherein provision is made to serve as an aid in the grinding of artificial dentures of various tooth alinements and arch formations.

With the above and other objects in view, the invention consists in the novel features of construction and in the arrangement and combination of parts to be hereinafter described and more particularly pointed out in the subjoined claims.

In the drawings:—

Fig. 5 is a horizontal section taken on line 5—5, Fig. 1.

Fig. 6 is a vertical section taken on line 6—6, Fig. 1, looking in the direction of the arrow crossing said line.

Fig. 7 is an enlarged side elevation of the upper portion of one of the uprights or posts, showing the same equipped with a special stop plate.

Fig. 8 is a horizontal section taken on line 8—8, Fig. 7.

Fig. 9 is a vertical longitudinal section through the incisal guide device arranged at the front end of the base.

Fig. 10 is a transverse section taken on line 10—10, Fig. 9.

Figure 1:
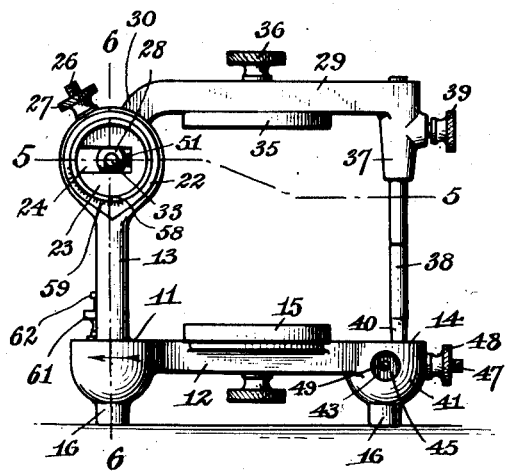
Fig. 1 is a side elevation of my improved articulator.
Figure 2:
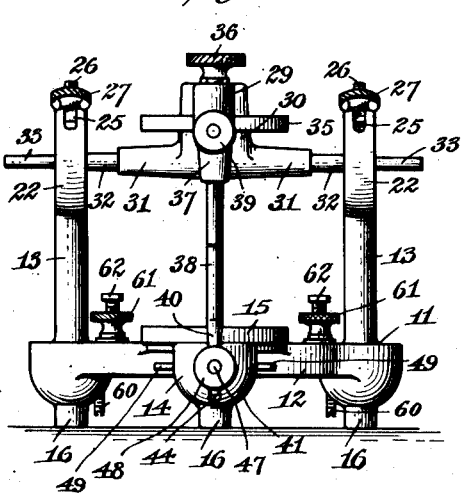
Fig. 2 is a front elevation of the same.
Figure 3:
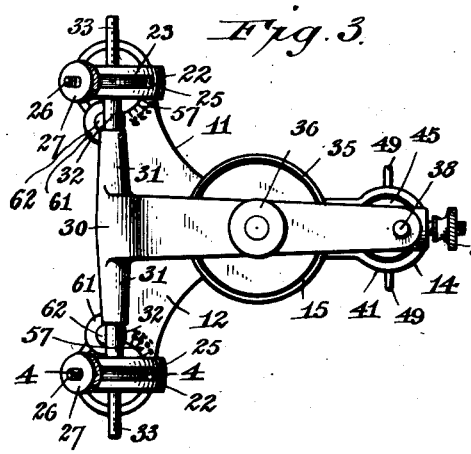
Fig. 3 is a plan view.
Figure 4:
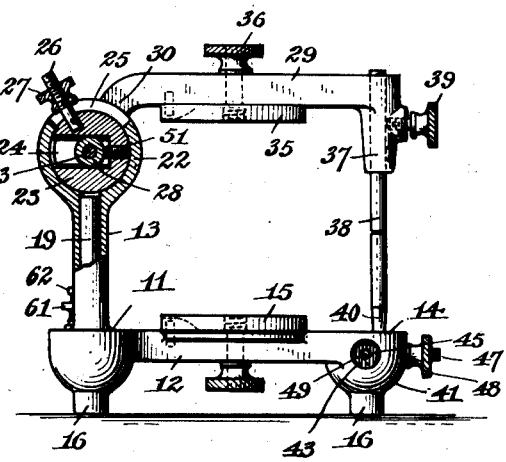
Fig. 4 is a sectional elevation, the section being taken through the upper portion of one of the rear uprights or posts, on line 4—4, Fig. 3.

In the representative form of my invention illustrated in the drawings, the numeral 11 designates a frame or support, which comprises a base 12 having two transversely spaced uprights or posts 13 rising from the rear end thereof and an incisal guide device 14 at its front end.

The base, while not an exact triangle, approaches a triangular formation in that it is wider at the rear end and gradually reduced toward its front end where the incisal guide device is arranged, and it has secured thereto by means of an adjusting screw, a mounting 15 for the base of the lower denture, this mounting being in a plane passing transversely between the uprights or posts 13 and the incisal device.

At the three corners of the triangular base 11, feet 16 are provided, and at the two rear angles of said triangular base it is provided in its upper face with circular depressions 17 and co-axial bores 18 extending through said feet. In said bores, rods 19 are secured in any suitable manner, the rods being of a length to extend from the lower end of the feet 16 upwardly a distance above the upper surface of the base. Each of the uprights or posts 13 comprises a slender intermediate portion 20 having a circumferential flange 21 at its lower end and a hollow circular head 22 at the upper end of said slender intermediate portion. Said posts are fitted over the upwardly extending portions of the rods 19 and are rotatable thereon, the flanges at the lower ends of said posts fitting into and being rotatable within the circular depressions 17 formed in the upper surface of said base. The uprights or posts 13 are in lateral alinement and the axes of the hollow cylindrical heads at the upper ends thereof coincide transversely when the various parts of the device are in normal position.

Rotatably fitted in each hollow circular head 22 is a disk 23 having a slot 24 extending from one point of the edge thereof inwardly beyond the axis of said disk, diametrically or otherwise, and preferably in a rectilinear manner, the opposite longitudinal walls of said slot being concaved, as clearly shown in Fig. 6. Each hollow circular head has a segmental slot 25 extending along a portion of its circular wall, preferably through the highest part of said circular head, and each disk has a screw stud 26 fastened therein which extends outwardly through the segmental slot of the head. A clamping nut 27 is threaded onto each of said screw studs and adapted to bear against the outer surface of the cooperating circular head to fasten the disk within said head in the desired rotatively adjusted position. It will be apparent therefore that since said disks 23 are rotatively adjustable in the uprights or posts 13, and the posts are rotatively adjustable in the base of the device that said disks are adjustable angularly, as well as rotatively, the angular adjustment being effected by rotation of the posts in which said disks are mounted, and the rotative adjustment being made within said posts.

Arranged within the slots 24 of the rotatably adjusted disks 23 are spherical or substantially spherical mountings or bearings 28 which are retained against lateral movement within said disks by reason of their spherical surfaces fitting the concaved walls of said slots and they are freely movable lengthwise within said slots, which slots therefore serve as guides or guideways, and more specifically considered as rectilinear guideways, for said mountings or bearings, owing to the mountings or bearings 28 being free to move lengthwise in the slots 24 of the rotatively adjustable disks 23, they may be referred to as rectilinearly-guided mountings.

29 designates the upper bracket or denture holding member, which for convenience may be referred to as the upper jaw member, while the base 12 may be referred to as the lower jaw member. This upper jaw member, in preferred form, is comparatively narrow, and it has a rearwardly and downwardly directed end portion 30 provided with opposite laterally-directed extensions 31 in which are secured rods 32 reduced in diameter along their outer portions, as at 33, to form outwardly facing shoulders 34. These rods are pinned or otherwise fastened into the opposite laterally-directed extensions 31 so that they practically form a part of the upper jaw member and serve as a pivot for the same. The outer reduced portions of said rods 32 extend through the spherical mountings or bearings 28 in the slots of the disks 23, and when the uprights or posts are positioned with their circular heads within the range of application, the shoulders of said rods bear against said mountings or bearings, thus preventing lengthwise movement of said rods therein whenever the centers of the spherical bearings coincide with the axes of the slots 24 and the disks 23.

As clearly shown in Fig. 6, the spherical mountings or bearings are in reality partispherical, for the reason that a portion of each is cut-away at right angles to its axis; in other words, each of said bearings is provided with a flattened face or portion. Said mountings or bearings are so positioned within the slots of the disks 23 that said flattened portions face inwardly and serve as stops for the shoulders 34 on rods 32.

Secured to the under side of the upper jaw member 29 is a mounting 35 to which the base of the upper denture is adapted to be secured, said mounting 35 being held in position by a thumb nut 36 passed through the upper jaw member and threaded into said mounting.

The upper jaw member has a depending portion 37 at its front end, in which a guide pin or stem 38 is adjustably fitted, said pin or stem being held in any adjusted position by means of a thumb screw 39 extending through said depending portion and bearing against said pin or stem. The lower end of this pin or stem is tapered, as at 40, and is adapted for co-action with the incisal guide, to be presently described.

The base or lower jaw member has a cup-like front end 41 extending into the front foot 16, this cup-like portion being formed by means of a comparatively deep depression 42 having preferably a rounded lower portion, but which may be given any other converging form, or be otherwise shaped. The wall of said cup-like portion is provided with circular openings 43 at diametrically opposite points and also with a vertical slot 44 at its front, said slot extending from a point at or near the bottom of the depression to the upper edge of the wall thereof.

Fitted in said depression is an incisal guide 45, which is shown in the drawing as approximately in the form of a semi-sphere, but which may be given any form adaptable for the purpose intended and the upper face of which is flat, as at 46. Fastened into the incisal guide and extending forwardly therefrom through the vertical slot 44 is a screw stud 47 onto which is threaded a thumb nut 48 adapted to bear against the outer side of the cup-like front end of the base or lower jaw, said screw stud having its axis alined with the center of said semi-spherical incisal guide. Extending from said incisal guide and also in alinement with the center of the same, are two laterally-directed stems 49, which extend outwardly through the circular openings 43 in the wall of said depression, said stems being of much smaller diameter than said openings so that they may move freely therein in any direction and serving as finger holds by means of which said incisal guide may be adjusted laterally, while by means of the screw stud 37 and thumb nut 38 said guide may be conveniently adjusted longitudinally within its receiving depression 42. The incisal guide is somewhat smaller than the depression in which it is seated, and has bearing at its lower end against the rounded inner or upper end of a bearing screw 50 threaded into the front foot 16 from the bottom thereof and extending into the depression 42 the desired extent. The incisal guide therefore bears against said bearing screw and against the wall of the depression 42 at the front only.

The lower end of the guide pin or stem 38 bears against the upper flat face of the incisal guide, which flat face is adjusted laterally, or longitudinally, or both laterally and longitudinally to meet the exact conditions under which the artificial teeth secured to the two jaw members are to be operated upon.

In order to accurately center the rods 32 within the disks 23 and normally retain said rods at the desired center, stop screws 51 are threaded into the disks 23 in line with the slots therein so that they project into the slots at the front ends thereof and the spherical bearings through which said rods are passed are adapted to normally bear against the inner ends of said stop screws.

Since said stop screws 51 are not accessible without removing the disks from the circular heads of the uprights or posts 13, there are exceptional cases when an adjustment of the rod is found desirable after being centered for natural position by the stop screws 51, and to make it unnecessary under such conditions to disassemble parts of the device, I have devised a stop plate 52 for each disk, which comprises a flat body portion 53 bearing against the outer side of the disk. The extensions 33 of the rods 32 are adapted to bear against the rear edges 54 of said plates when used, and each stop plate has parallel slots 55 through which screws 56 are passed that take into the co-operating disk, said slots permitting the plates to be moved rearwardly to any desired extent for changing the extreme forward positions of the centers of the rods 32.

The uprights or posts 13 are rotatable within the depressions 17 in the base 12 and on the rods 19 extending upwardly from said base, and on the flange 21 of each upright or post an indicating mark or point is provided, which is adapted to be adjusted relative to a segmental series of graduation marks 57 on the base 12 adjacent each of said flanges. When the uprights or posts are positioned so that the circular heads at the upper ends thereof are parallel, the indicating mark or point on each flange 21 registers with the zero mark of the series of graduation marks 57.

By providing the base with graduation marks and the flanges 21 with an indicating mark, or reversely, the exact degree of rotation of the uprights or posts and consequently the desired position or angularity of the circular heads of said uprights or posts can be instantly determined.

The slots 24 in the disks 23 are normally in horizontal position and these disks are adapted to be adjusted within said heads so that the slots 24 will be positioned at an angle to the horizontal, either above or below the horizontal. To readily determine the exact angularity or inclination of these slots, each disk has an indicating mark 58, while the head has a segmental series of graduation marks 59, the indicating mark 58 being normally registered with the zero mark of the segmental series of graduation marks when the slot in the disk is in horizontal position, or with any one of the graduation marks either to the right or left of zero when said slot is in inclined position.

In exceptional cases it is desirable to elevate the centers of the rods 32, and to accomplish this it is necessary to raise the uprights or posts 13. For this purpose, adjusting screws 60 are threaded through the base from the bottom thereof, said adjusting screws having their upper ends bearing against the under side of the flanges 21 of said uprights or posts.

As shown in Fig. 6, the lower ends of the posts are firmly seated against the bottoms of the depression 17, but when it is found necessary to elevate the center of the rods 32, the adjusting screws 60 are threaded into the base to a greater extent than shown, with the result that the posts will be elevated. When the uprights or posts 13 are adjusted rotatably, they are retained in adjusted position by clamping screws 61 arranged on the screw post 62, which are threaded or otherwise fastened into the base, the clamping screws 61 bearing against the bearing faces of said flanges. By reason of said clamping screws being threaded onto the screw posts 62 they can be elevated on the latter, and when the uprights or posts 13 are raised by the adjusting screws 60, the clamping screws will serve fully as well to clamp said posts in rotatively-adjusted position as when they are fully seated within the depressions 17.

It will be apparent from the foregoing that the upper jaw member is capable of swinging on an arc of a circle, the rods 32 in reality serving as stub shafts or a pivot for said upper jaw member; also, that when the circular heads 22 at the upper ends of the uprights or posts 13 are parallel, said stub shafts are at a perfect right angle to said circular heads.

The centers of the spherical mountings may be compared with the condyle socket centers of the human maxillæ and when the pin 38 rests on the guide surface of the incisal guide and the spherical bearings 28 in slots 24 rest against the stops 51, the dentures secured to the mountings 15 and 35 are held in a position of central occlusion. While the incisal guide 45 is shown as having a perfectly flat guiding surface, this guiding surface may be made convex, concave, or it may have any other formation; and regardless of the formation of its guiding surface, it is universally adjustable. For the purpose of illustrating its adjustability, I have shown one form in which it is adjustable within the base or, more particularly, within the depression 42 within the base, but it will be apparent that a universally adjustable incisal guide may be provided without resorting to the use of a depression, such as 42. The guiding surface of said incisal guide is capable of being inclined forwardly, laterally or both forwardly and laterally in either direction, depending on the conditions and requirements of the mandible of the patient for whom artificial teeth are to be fitted.

The adjustment of the incisal guide is easily effected by loosening the thumb nut 48 and swinging the parti-spherical guide in the desired direction and then tightening said thumb nut to retain the guide in adjusted position. If a lateral inclination is desired, with or without a forward inclination, the stems 49 provide a convenient means for positioning said guide at the desired angle.

When the upper jaw member is manipulated, the lower end of the guide pin or stem 38 will travel in contact with the guide surface of the incisal guide 45 while the spherical mountings 28 for the rods or shafts 32 will move backward and forward within the slots 24 of the disks retained within the circular heads of the uprights or posts 13. Thus said slots serve as means to guide the spherical mountings for movement in said disks. When said circular heads are maintained in parallel relation longitudinally, practically no lateral movement is allowed the upper jaw member at the rear end thereof, as the outwardly-facing shoulders 34 on the rods or shafts 32 bear against the inner flat faces of the substantially spherical mountings, and it may here be stated that the upper and lower walls of the slots 24, which may be termed guide slots, are concaved so that the spherical mountings cannot possibly become displaced by lateral movement within said slots. The effected restrained movement described is equivalent to a protrusive excursion of its mandible.

Invariably it will be found necessary to adjust the uprights or posts 13 rotatably so as to bring the circular heads at the upper ends thereof in angular positions converging forwardly, and at such times the rear ends of the guide slots 24 are spaced a greater distance apart, with the result that when the spherical mountings 28 are moved rearwardly in said slots, a simultaneous lateral movement of the upper jaw member takes place, with the result that the flat inner faces of said mountings 28 are spaced a greater distance apart than the outwardly facing shoulders 34 on the rods or shafts 32, and the latter are therefore free to move lengthwise within said mountings, thus giving the rear end of the upper jaw member a backward and forward movement, with a varying lateral component movement. The rods or shafts 32 therefore are mounted for rotatable movement and also sliding movement in two directions.

As hereinbefore stated, the centers of the spherical mountings may represent the condyle socket centers of the maxillæ, and as the rods or shafts 32, or more particularly the reduced outer ends of said rods or shafts extend through said centers, the axes of said rods or shafts represent the maxillary condyle line and the centers of said spherical mountings represent the condyle socket centers. Owing to the fact that the rods or shafts 32 are movable laterally, a movement is provided in this articulator which is equivalent to that of the lateral excursions of the condyle head centers of the patient for whom the teeth are to be prepared.

In most cases the angularity of the circular heads differ after adjusting them to the measurements of the patient, and most frequently the condyle socket centers of the patient have a slight upward movement in addition to a rearward and lateral movement. For such cases the disks 23 within the circular heads 22 are adjusted to incline the guide slots 24 in said disks upwardly in a rearward direction; therefore, when moving the guide stem over the incisal guiding surface, each condyle socket center has a combined rearward and upward, and a component lateral movement.

The upper jaw member has axes of rotation, which vary according to formation and measurement of the bones and tissues of the patient, and these axes of rotation are changed by adjusting the uprights or posts rotatively and also the disks within the upper ends thereof.

In exceptional cases it is found necessary to position the condyle socket centers, represented by the intersecting axes of the rods or shafts 32 and the centers of the mountings 28, rearwardly beyond that at which the device is set, and for this reason the stop plates 53 are provided, which can be easily adjusted for this purpose, and when adjusted the edges 54 of said plates fix the maximum advance or forward position of the rods or shafts 32 at a more rearward point.

From the foregoing it will be apparent that by reason of the disks 23 being provided with guide slots, the front end of the upper jaw member is capable of being moved rearwardly and forwardly with a component movement laterally, and due to the fact that the mountings are free to slide backwardly and forwardly in the guide slots and the upper member is capable of swinging on its extensions, the lower end of the guide pin or stem 38 moves in contact with the incisal guide.

When the incisal guide is inclined forwardly or laterally, or both forwardly and laterally, a component upward and downward movement of the front end of the jaw member is added to the other movements last above referred to, and when adjusting the disks 23 within the upper ends of the uprights so as to incline the slots therein and cause the mountings in said slots to have a rising and falling movement in connection with their movemets in a longitudinal direction, a variation in the last-mentioned movement is created, which, when combined with movements of the mountings laterally inwardly and outwardly, permits relative lateral movement of the condyle head centers, represented by the common intersection of the axes of slots 24, disks 23 and rods 19. Thus the device is capable of performing movements equivalent to all masticatory movements.

By reason of the rear support of the upper jaw member being universally adjustable and the condyle socket centers being capable of lateral movement inwardly and outwardly, and also rearwardly and forwardly with component upward and downward movements, the mountings, or centers of intersection between said mountings and the shafts or rods are capable of all desired relative positions of mandibular to maxillary condyle line, while the lower end of the guide stem which represented a point integral with the upper jaw member is moved in accordance with the adjustment of the incisal guide, and as said guide stem is vertically adjustable in the upper jaw member, which represents the maxilla, and this member is supported at its rear end in the manner described, an independent opening or closing of the jaw members is made possible for the purpose of adjustment without substantially altering the various component movements required for the operation in the execution of articulation.

Having thus described my invention, what I claim is:—

1. A dental articulator, comprising a frame having an incisal guide at its front end and universally movable constrained centers in triangular relation to said incisal guide, and a jaw member guided for movement by said universal centers and incisal guide.

2. A dental articulator, comprising a base having rotatable uprights spaced apart at its rear end and an incisal guide at its front end in triangular relation to said uprights, rectilinearly-guided mountings within said uprights, and an upper jaw member pivotally and slidably mounted in said mountings and having a depending guide element adapted for co-action with said incisal guide.

3. A dental articulator, comprising a frame, spaced mountings, rectilinear guides for said mountings rotatably adjustable in two directions, an incisal guide in triangular relation to said mountings and in a lower plane than said mountings, and a jaw member supported pivotally and slidably laterally in said mountings and having a guide element adapted for co-action with said incisal guide.

4. A dental articulator, comprising a frame having elevated rectilinear guides rotatably adjustable in two directions and an incisal guide in triangular relation to said rectilinear guides, and a jaw member having lateral extensions extending through said rectilinear guides and being rotatable and laterally movable within the same, said jaw member having a guide element adapted for co-action with said incisal guide.

5. A dental articulator, comprising a base having an incisal guide at its front end and two spaced uprights at its rear end forming a triangle with said incisal guide, rotatable adjustable supports at the upper ends of said uprights having rectilinear guide ways therein, an upper jaw member having laterally extending rods pivotally arranged and slidable in two directions within said rotatable adjustable supports, and a depending guide stem at the front end of said upper jaw member adapted for co-action with said incisal guide.

6. A dental articulator, comprising a base serving as a lower jaw member and having an incisal guide at its front end and two rotatably adjustable uprights at its rear end in triangular relation with said incisal guide, disks rotatably adjustable within the upper ends of said uprights having guide slots therein, mountings slidable within said slots and self adjustable therein, an upper jaw member pivotally and slidably supported in said mountings, and an adjustable depending guide stem on said upper jaw member adapted for co-action with said incisal guide.

7. A dental articulator having a jaw member provided with an incisal guide at its front end and elevated mounting guides at its rear end in triangular relation with said incisal guide, means for adjusting said mounting guides on vertical and horizontal centers, universally movable mountings within said guides, an upper jaw member having lateral sliding movement within said mountings and adapted to move said mountings within their guides, said upper jaw member having a depending guide element adapted for co-action with said incisal guide.

8. A dental articulator, comprising a frame having two spaced rotatably adjustable uprights, universally movable mountings in said uprights, and an upper jaw member having laterally extending rods extending through said mountings.

9. A dental articulator, comprising a frame having two spaced uprights longitudinally and rotatably adjustable, universally movable mountings in said uprights, and an upper jaw member having laterally extending rods extending through said mountings.

10. A dental articulator having a base provided with a depression, an incisal guide universally adjustable about its own center in said depression, and means to retain said incisal guide in adjusted position.

11. A dental articulator having a base provided with a depression having a converging lower portion and openings at diametrically opposite points, and an incisal guide adjustable in said depression and of corresponding formation, said incisal guide having laterally extending stems projecting through said openings.

12. A dental articulator having a base provided with a cup-like portion at its front end, said cup-like portion having a vertically-disposed slot in its wall and openings at diametrically opposite points at right angles to said slot, an incisal guide adjustable in said cup-like portion and having opposite lateral stems extending through said openings, a screw stud extending through said slot, and a thumb nut threaded onto said screw stud.

13. A dental articulator having a base provided with a deep depression having a concaved lower portion, the wall of said depression having openings at diametrically opposite points and a slot at right angles to said openings, an incisal guide in said depression having a rounded lower portion and an upper guiding surface, stems on said incisal guide extending through said openings, and means co-acting with said slot to retain said incisal guide in any adjusted position.

14. An incisal guide device for dental articulators, comprising a cup-like member having a concaved lower portion and being provided with diametrically opposite openings, an incisal guide having a rounded lower portion and fitting into said cup-like member, said incisal guide having stems projecting from diametrically opposite points thereof which extend through said openings, and means for retaining said incisal guide in any adjusted position.

15. An incisal guide device for dental articulators, comprising a cup-like member having an adjusting screw threaded through its bottom and extending thereinto, an incisal guide receiving support from said adjusting screw, and means for permitting a universal adjustment of said incisal guide and whereby said guide is maintained in adjusted position.

16. A dental articular, comprising a base adapted to receive a lower denture and having an incisal guide device at its front end and two spaced uprights at its rear end in triangular relation with said incisal guide, said uprights having hollow circular heads provided with slots in their circular walls, a disk rotatably adjustable in each of said circular heads and having guide slots, said guide slots having upper and lower concaved guide walls, a screw stem extending from the periphery of each of said disks and extending through the slot in the surrounding wall thereof, a thumb nut threaded onto each screw stem, spherical mountings universally movable in the guide slots of said disks, and an upper jaw member co-acting with said incisal guides at its front end and having laterally extending rods at its rear end, said rods being rotatable with or within said mountings and also slidable therein.

17. A dental articular, comprising two co-operating jaw members having co-acting incisal guiding means at their front ends and constrained universally movable spaced connections at their rear ends arranged in triangular relation with said incisal guiding means and assuring movement relatively of said jaw members by guidance along predetermined paths.

18. A dental articulator, comprising a base adapted to receive a lower denture and having an incisal guide at its front end, uprights rotatably adjustable on said base, said base and uprights having co-operating means to determine the exact degree of rotative adjustment of said uprights, an upper jaw member supported at its rear ends by said uprights and being slidable therein in two directions, said upper jaw member being also provided at its front end with a guide element adapted for co-action with said incisal guide.

19. A dental articulator, comprising a base having spaced depressions at its rear end, said base having a series of segmental graduations adjacent each depression, uprights rotatably mounted in said depressions, an upper jaw member pivotally mounted in the upper ends of said uprights, and co-acting incisal guiding means at the front ends of said base and upper jaw member.

20. A dental articulator, comprising a base having an incisal guide at its front end and being provided with spaced depressions at its rear end, uprights having circumferential flanges at their lower ends fitting said depressions and being rotatably adjustable in said depressions, means for maintaining the rotative adjustments of said uprights, an upper jaw member supported in the upper ends of said uprights, and a guiding stem depending from the front end of said upper jaw member and adapted for co-action with said incisal guide.

21. A dental articulator, comprising a base having an incisal guide at its front end and two spaced circular depressions at its rear end, uprights mounted with their lower ends in said depressions, means for adjusting said uprights longitudinally, an upper jaw member supported in the upper ends of said uprights, and a depending guide stem at the front end of said upper jaw member adapted for co-action with said incisal guide.

22. A dental articulator, comprising a base having an incisal guide at its front end and spaced circular depressions at its rear end in triangular relation with said incisal guide, uprights having their lower ends entered in said depressions, screws extending through said base and adapted to engage the lower ends of said uprights to adjust the same lengthwise, an upper jaw member slidably and rotatably mounted in the upper ends of said uprights, and an adjustable guide stem depending from the front end of said upper jaw member and adapted for co-action with said incisal guide.

23. A dental articulator, comprising a base having an incisal guide at its front end and a pair of circular depressions at its rear end in triangular relation with said incisal guide, rotatably adjustable uprights having circumferential flanges at their lower ends entered into said circular depressions, clamping nuts adjustable on said base adapted to engage said flanges and retain said uprights in desired rotative adjustment, an upper jaw member pivotally and slidably supported at the upper ends of said uprights, and a guide stem depending from the front end of said upper jaw member and adapted for co-action with said incisal guide.

24. A dental articulator, comprising a base having an incisal guide at its front end, rods spaced apart and rising from said base, said rods being in triangular relation with said incisal guide, hollow uprights rotatably adjustable on said rods, an upper jaw member supported by said uprights, and a guide element on said upper jaw member adapted for co-action with said incisal guide.

25. A dental articulator, comprising a base having an incisal guide at its front end and spaced circular depressions at its rear end in triangular relation with said incisal guide, rods secured to said base and extending upward axially from said circular depressions, hollow uprights fitted over said rods and having circumferential flanges at their lower ends fitting said circular depressions, means for maintaining said uprights in desired position on said rods, an upper jaw member supported at its rear end and at opposite sides by said uprights, and a depending guide stem at the front end of said upper jaw member adapted for co-action with said incisal guide.

26. A dental articulator, comprising a base having an incisal guide at its front end, spaced uprights at its rear end in triangular relation with said incisal guide, said uprights having hollow circular heads, the circular wall of each of said heads being provided at one edge with a segmental series of graduations, a disk slotted in a diametral direction fitted into each of said hollow heads and rotatably adjustable therein, a mounting slidable lengthwise in each slot and universally rotatable therein, each disk having an indicating mark co-acting with said segmental series of graduation marks, an upper jaw member having opposite laterally extending rods passed through said mountings, and a guide stem depending from the front end of said upper jaw member and co-acting with said incisal guide.

27. In a dental articulator, supports for an upper jaw member having supporting pivots, comprising angularly and rotatively adjustable disks provided with slots having opposite concaved guide walls, and mountings fitted into said concaved guide walls capable of universal self-adjustment therein, said mountings receiving the pivots of said upper jaw member.

28. In a dental articulator, the combination with an upper jaw member having oppositely extending cylindrical rods, of spaced supports for said rods comprising angularly and rotatively adjustable disks provided with slots extending inwardly from the edges thereof, mountings in said slots adapted to receive the rods of said upper jaw member, and screws adjustable in said disks projecting from the inner walls of said slots and against which said mountings normally bear.

29. In a dental articulator, the combination with an upper jaw member having opposite lateral cylindrical rods, of spaced supported disks rotatively and angularly adjustable, each disk having a slot extending from the edge thereof, mountings universally movable in said slots and through which the rods of said upper jaw member extend, and a stop plate adjustably applied to each disk and bearing against said cylindrical rods.

30. A dental articulator, comprising two co-acting members and an incisal guide universally movable on its own center, said incisal guide being applied to one of said members and adapted to be engaged by a part of the other member.

31. A dental articulator, comprising two co-acting members, one laterally slidable and pivotally hinged to the other in a constrained manner, one of said members having a universally adjustable incisal guide and the other having a guide element adapted for co-action with said incisal guide.

32. A dental articulator having a base, an incisal guide universally adjustable on its own center and carried by said base, and means to retain said incisal guide in adjusted position.

33. A dental articulator having a support provided with a depression whose lower portion is made converging, and an incisal guide universally adjustable within said depression.

34. A dental articulator comprising a frame having an incisal guide at its front end, a jaw member having a guide element co-acting with said incisal guide and adapted to carry a denture thereon, and elevated centers movably guided in triangular relation to said incisal guide relatively adjustable so as to conform with the measurements and conditions found in the patient adapted to receive the denture, said jaw member being laterally movably supported by said centers and being adapted for movements equivalent to mandibular movements.

In testimony whereof I affix my signature.

RUDOLPH L. HANAU.